United States Patent [19]  [11] Patent Number: 4,604,367
Takamizawa et al.  [45] Date of Patent: Aug. 5, 1986

[54] METHOD FOR THE PREPARATION OF AN INORGANIC FIBER CONTAINING SILICON, CARBON, BORON AND NITROGEN

[75] Inventors: Minoru Takamizawa; Taishi Kobayashi; Akira Hayashida; Yoshihumi Takeda, all of Niigata, Japan

[73] Assignee: Shin-Etsu Chemical Co., Ltd., Tokyo, Japan

[21] Appl. No.: 682,796

[22] Filed: Dec. 18, 1984

[30] Foreign Application Priority Data

Dec. 27, 1983 [JP] Japan .................. 58-248030

[51] Int. Cl.⁴ ............................ C04B 35/02
[52] U.S. Cl. ...................... 501/95; 501/88; 423/345; 556/430
[58] Field of Search .......... 501/95, 88; 423/345; 556/402, 430; 528/7

[56] References Cited

U.S. PATENT DOCUMENTS 3,018,299  1/1962  Pike ........................ 556/402
3,154,520 10/1964  Dupont et al. ............. 556/402
3,422,060  1/1969  Fink ........................ 556/402
4,097,294  6/1978  Rice et al. ................ 501/88
4,122,139 10/1978  Yajima et al. ............. 501/88
4,283,376  8/1981  Yajima et al. ............. 423/345
4,482,689 11/1984  Haluska .................... 423/345

Primary Examiner—William R. Dixon, Jr.
Assistant Examiner—Steven Capella
Attorney, Agent, or Firm—Toren, McGeady, Stanger, Goldberg & Kiel

[57]  ABSTRACT

The invention provides a novel inorganic fiber composed of the elements of silicon, carbon, boron and nitrogen of which the Si/B molar ratio is 2:1 to 200:1. The inorganic fiber is obtained by a method comprising the steps of: (a) preparing an organoborosilicon polymer by heating a mixture of an organopolysilane and an organoborazine compound, e.g. B-trimethyl-N-triphenyl borazine, to effect thermal decomposition and polycondensation reaction; (b) spinning the polymer into a fibrous form; (c) infusibilizing the fiber of the polymer by thermally oxidizing in an oxidizing atmosphere or by irradiating with ionizing radiations; and (d) calcining the infusibilized fiber at 900° to 1800° C. The inventive inorganic fiber is more stable at high temperatures than conventional silicon carbide fibers.

8 Claims, 4 Drawing Figures

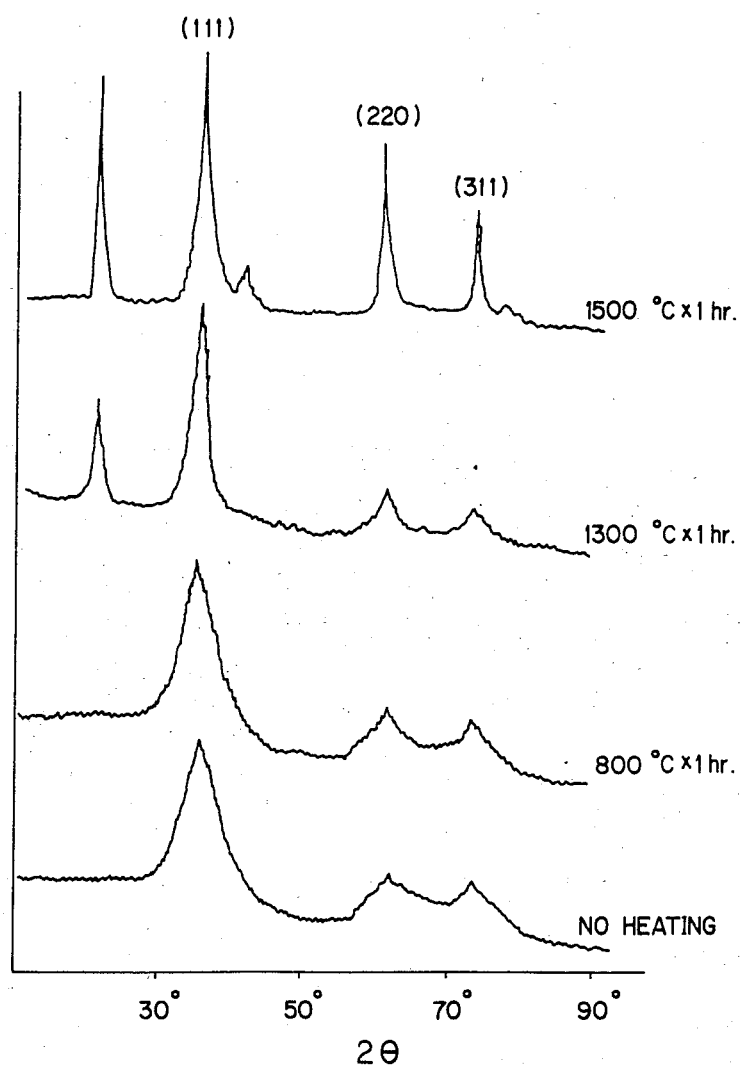

METHOD FOR THE PREPARATION OF AN INORGANIC FIBER CONTAINING SILICON, CARBON, BORON AND NITROGEN

BACKGROUND OF THE INVENTION

The present invention relates to a method for the preparation of novel inorganic fibers or, more particularly, inorganic fibers containing silicon, carbon, boron and nitrogen as the constituent elements and having excellent heat resistance and physical and mechanical properties.

As is known, fibers mainly composed of silicon carbide have been developed in recent years with an intended application as a reinforcing material in several high-performance composite materials such as FRM (fiber-reinforced metal) and FRC (fiber-reinforced ceramic). The silicon carbide-based fibers are highlighted in such an application in place of carbon fibers by virtue of not only the more excellent heat resistance and oxidation resistance but also the higher affinity and wettability with the matrix material such as metals than carbon fibers. A method for the preparation of silicon carbide-based fibers is disclosed, for example, in Japanese Patent Publication Nos. 57-53892 and 57-56566 according to which a polycarbosilane having a main chain composed of silicon and carbon is first synthesized and it is spun into a fibrous form followed by infusibilization and calcination to be converted into silicon carbide. Further, several attempts have been made with an object to improve the mechanical properties of the silicon carbide-based fibers derived from polycarbosilanes by introducing other kinds of elements thereinto including the introduction of a borosiloxane disclosed in Japanese Patent Kokai No. 54-82435, titanoalkoxide disclosed in Japanese Patent Publication No. 58-5286 and zirconoalkoxide disclosed in Japanese Patent Kokai No. 57-106718.

Several problems are, however, unavoidable in the above described process for the preparation of silicon carbide-based fibers via polycarbosilanes. For example, the polycarbosilane compound must be synthesized by a reaction under a high pressure at a high temperature taking a long time. In addition, the yield of the desired polycarbosilane is disadvantageously low with low productivity even by setting aside the problem in connection with the apparatus used for the reaction. The introduction of the above mentioned different elements such as boron, titanium and zirconium into the polycarbosilane is also not free from problems and disadvantages in the properties of the resultant silicon carbide-based fibers because these heteroatoms are always bonded to the silicon atoms through an intermediate oxygen linkage such as -Si-O-B-, -Si-O-Ti- and -Si-O-Zr- so that the silicon carbide-based fibers contain an increasing amount of oxide as the amount of the introduced heteroatoms is increased. Further, the silicon carbide-based fibers prepared in this manner are usually composed of aggregates of extremely fine crystallites or grains of silicon carbide having a particle size of about 2 nm and heating of the fibers at 1300° C. or higher causes growth of the crystallites or grains resulting in decrease of the mechanical strength of the fibers.

SUMMARY OF THE INVENTION

It is therefore an object of the present invention to provide a method for the preparation of inorganic fibers free from the above described problems and disadvantages in the silicon carbide-based fibers in the prior art.

Thus, the method of the present invention for the preparation of an inorganic fiber containing silicon, carbon, boron and nitrogen as the constituent elements in the main chain of the molecule comprises the steps of:

(a) heating a reactant mixture composed of an organosilicon compound having, in a molecule, at least one silicon-to-silicon linkage and at least one group denoted by $R^1$, $R^1$ being a hydrogen atom or a monovalent hydrocarbon group selected from the class consisting of methyl, ethyl, vinyl and phenyl groups, bonded to the silicon atom and an organoboron compound represented by the unit formula $-BR^2-NR^3-$, in which $R^2$ is a monovalent group selected from the class consisting of monovalent hydrocarbon groups, trihydrocarbylsilyl-substituted alkyl groups of the formula $-(CH_2)_n SiR^4_3$, $R^4$ being a monovalent hydrocarbon group and n being a positive integer, and substituted or unsubstituted amino groups of the formula $-NR_2^5$, $R^5$ being a hydrogen atom or a monovalent hydrocarbon group, and $R^3$ is a monovalent hydrocarbon group, in a silicon to boron molar ratio in the range from 2:1 to 200:1 at a temperature in the range from 250° to 500° C. in an inert atmosphere to effect thermal decomposition and polycondensation reaction of the reactants and to form an organoborosilicon polymer having a number-average molecular weight in the range from 1,000 to 50,000, of which the main chain of the molecule is composed of the elements of silicon, carbon, boron and nitrogen;

(b) spinning the organoborosilicon polymer into a fibrous form;

(c) infusibilizing the thus formed fiber of the organoborosilicon polymer; and (d) calcining the infusibilized fiber of the organoborosilicon polymer at a temperature in the range from 900° to 1800° C. in an atmosphere of vacuum or an inert gas.

BRIEF DESCRIPTION OF THE DRAWING

FIGS. 2 to 4 each illustrate the X-ray diffraction diagrams of the inventive inorganic fibers infusibilized by oxidation as prepared in Example 2, the same infusibilized by electron beam irradiation and a commercial product of silicon carbide fibers, respectively, either as prepared or after a heat treatment at different temperatures for 1 hour.

DETAILED DESCRIPTION OF THE PREFERRED EMBODIMENTS

Figure 1:
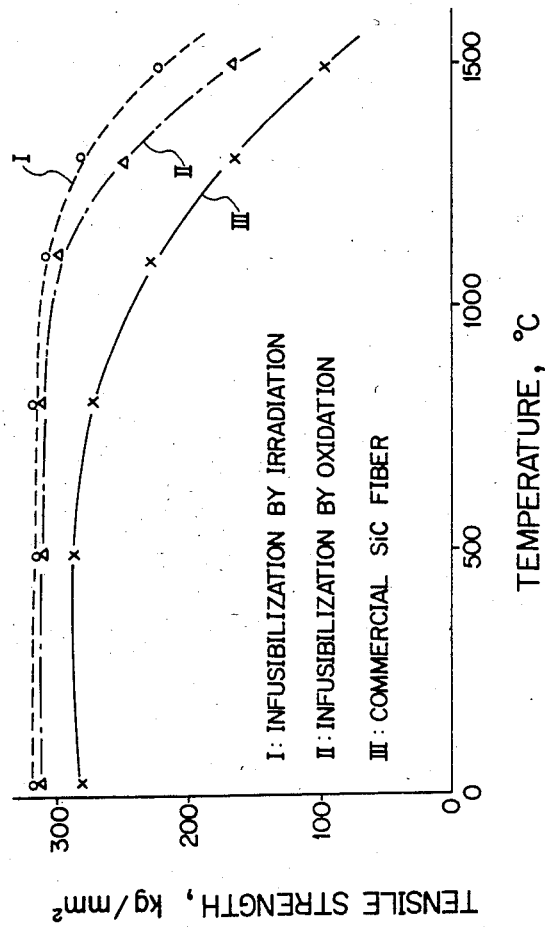
FIG. 1 is a graph showing the relationship between the temperature of heat treatment and the tensile strength of the inventive inorganic fibers prepared in Example 2 and a commercial product of silicon carbide fibers.

The first step, i.e. step (a), of the inventive method is the preparation of the polymer subjected to spinning into a fibrous form in the following step and the polymer is an organoborosilicon polymer of which the main chain of the molecule is composed of the elements of silicon, carbon, boron and nitrogen. As is described above, the organoborosilicon polymer is prepared by the thermal decomposition and polycondensation reaction of an organosilicon compound and an organoboron compound at a temperature in the range from 250° to 500° C.

The organosilicon compound is an organopolysilane compound having at least one silicon-to-silicon linkage in a molecule and at least one group denoted by $R^1$ which is a hydrogen atom or a monovalent hydrocarbon group selected from the class consisting of methyl, ethyl, vinyl and phenyl groups. Although not all of the groups denoted by $R^1$ in a molecule should be of the same kind, it is preferable that not all of the groups $R^1$ are hydrogen atoms. Such an organopolysilane compound can be obtained, for example, by the reaction of an organochlorosilane and metallic sodium in a cyclic, linear or networked molecular structure or obtained as a byproduct mainly composed of the units of $(CH_3)_2Si=$ and $CH_3S\equiv$ in the direct synthesis of methyl chlorosilanes by the reaction of methyl chloride and metallic silicon as is disclosed in Japanese Patent Kokai No. 57-34131 and Japanese Patent Publication No. 55-49621. It is of course optional that the organosilicon reactant in the reaction of the step (a) is a mixture of two kinds or more of such organopolysilane compounds.

The other reactant subjected to the thermal decomposition and polycondensation reaction in the step (a) with the organopolysilane compound is an organoboron compound formed of the units represented by the formula $-BR^2-NR^3-$, in which $R^2$ is a monovalent group selected from the class consisting of monovalent hydrocarbon groups including alkyl groups such as methyl, ethyl and propyl groups, alkenyl groups such as vinyl and allyl groups, aryl groups such as phenyl and tolyl groups and cycloalkyl groups such as cyclohexyl group, trihydrocarbylsilyl-substituted alkyl groups including trimethylsilylmethyl and trimethylsilylethyl groups and substituted or unsubstituted amino groups including amino, dimethylamino, diethylamino and monophenylamino groups and $R^3$ is a monovalent hydrocarbon group which may be one of those given above as the examples of hydrocarbon groups for $R^2$. Although the molecular structure of the organoboron compound is not particularly limitative including cyclic and linear ones, it is preferably a borazine compound represented by the general formula $(-BR^2-NR^3-)_3$ having a cyclic structure. Preferable organoboron compounds include B-trimethyl-N-triphenyl bor-azine, B-trivinyl-N-triphenyl borazine and B-triamino-N-triphenyl borazine.

The reaction between the polysilane compound and such an organoboron compound can readily take place when they are mixed together and heated in an atmosphere of an inert gas. Though dependent on the types of the polysilane compound and the organoboron compound as well as the mixing ratio thereof, the reaction is usually complete within 1 to 10 hours at 250° to 500° C. under normal pressure or, optionally, under an increased pressure of up to 20 atmospheres. The mixing ratio of these reactants should be in such a range that the molar ratio of the silicon atoms to the boron atoms is in the range from 2:1 to 200:1. When this molar ratio is smaller than 2:1, the inorganic fiber after calcination loses the characteristic properties as silicon carbide while, on the other hand, the molar ratio larger than 200:1 results in the decrease of the advantages in respect of the moderate reaction conditions of the pressure, temperature and time as well as the less remarkable improvement in the heat resistance of the inorganic fibers after calcination.

The product of the reaction is an organoborosilicon polymer comprising the elements of silicon, carbon, boron and nitrogen and the nature of this polymer is widely varied from liquid to solid depending on the starting reactants and the reaction conditions. The number average molecular weight of the organoborosilicon polymer is preferably in the range from 1,000 to 50,000 in view of the intended application of the polymer as a material for spinning into a fibrous form. It is also preferable that the polymer is freed from any trace amount of volatile matters by stripping under reduced pressure.

The second step, i.e. step (b), of the inventive method relates to spinning of the organoborosilicon polymer prepared in the preceding step (a) into a fibrous form. The spinning of the polymer is performed either by the method of melt spinning using a spinning melt of the polymer as such or by the method of dry spinning using a spinning dope prepared by dissolving the polymer in a suitable organic solvent such as benzene, toluene, hexane, tetrahydrofuran and the like followed by filtration to remove microgels and insoluble or infusible impurities. The apparatus for spinning may be a conventional one used for the melt spinning or dry spinning of synthetic fibers and pitch-based carbon fibers and the fiber coming out of the opening of the spinnerette is subjected to drawing elongation by controlling the velocity of winding up in such a manner that the fiber may have a desired diameter. Such a fiber is called a green fiber or filament.

The third step, i.e. step (c), of the inventive method is the infusibilization of the green fiber obtained in the step (b) or, in particular, the surface layer of the green fiber as a pretreatment for the next-coming step (d) of calcination by preventing melt-sticking of the green fibers. This step of infusibilization of the green fiber is performed either by heating or by irradiating the fiber with actinic rays. When the method of heating is undertaken for the infusibilization, the green fiber is heated at a temperature in the range from 100° to 200° C. for a few minutes to several tens of hours in an oxidizing atmosphere with or without tension so that the Si-H linkages on the fiber surface are oxidized to form a thin oxidized surface layer. The oxidizing atmosphere may be formed with air, oxygen, ozone and the like gas and the temperature of heating should be adequately selected in consideration of the properties of the green fiber although it is of course that the heating temperature should be lower than the melting point of the organoborosilicon polymer. It is preferable that this oxidizing heating of the green fiber is performed under tension in a range not to cause breaking of the fiber in order to avoid crimping of the fiber due to the thermal shrinkage thereof.

When the infusibilization is performed by the irradiation with actinic rays, the green fiber is irradiated with gammarays or electron beams in an atmosphere of an inert gas or in vacuum, if necessary, under tension and at a temperature somewhat higher than room temperature to effect polymerization and crosslinking reaction of the organoborosilicon polymer. The irradiation dose should preferably be in the range from $10^5$ to $10^{10}$ rads depending on the properties of the green fiber. This method of radiation infusibilization is particularly preferable in respect of the higher heat resistance of the finished inorganic fiber product after calcination than the fibers obtained by the oxidation infusibilization because the radiation-infusibilized fibers contain almost no oxygen.

The fourth step, i.e. step (d), of the inventive method relates to the calcination of the fiber infusibilized in the step (c) and the infusibilized fiber is heated at a temperature in the range from 900° to 1800° C. in an atmosphere of an inert gas or in vacuum so that the organoborosilicon polymer forming the fiber is completely converted into an inorganic material. When the temperature of the infusibilized fiber is gradually increased from room temperature, the reaction of thermal polymerization and decomposition of the organoborosilicon polymer begins at about 400° C. and continuedly proceeds until the temperature reaches about 900° C. where the reaction for the conversion of the polymer into an inorganic material is started. Therefore, the rate of temperature increase should preferably be slow enough to avoid rapid and violent proceeding of the above mentioned thermal polymerization and decomposition of the organoborosilicon polymer. The temperature of calcination should be in the range from 900° to 1800° C. or, preferably, from 1000° to 1600° C. because the conversion of the organoborosilicon polymer into an inorganic material is incomplete when the temperature is lower than 900° C. while a temperature higher than 1800° C. greatly accelerates the growth of the fiber crystallites formed of the elements of silicon, carbon, boron and nitrogen resulting in rapid decrease in the mechanical strength of the inorganic fiber.

The fibrous material obtained in the above described steps (a) to (d) is an inorganic fiber composed substantially of the elements of silicon, carbon, boron and nitrogen and the results of chemical analysis support the fact that the elements of boron and nitrogen contained in the organoboron compound, e.g. borazine compound, as the starting reactant in the step (a) are almost quantitatively retained in the finished fibers. Further, the results of the X-ray diffractometry indicate that the main constituent of the fiber is β-SiC in a form of extremely fine crystallites having a diameter of 2 to 5 nm and the constituent of boron and nitrogen intervenes between the fine crystallites of the silicon carbide in the form of BC or BN. It is presumable that the intervention of the boron/nitrogen constituent between the silicon carbide crystallites is effective in preventing the growth of the silicon carbide crystallites at a high temperature of 1300° C. or higher contributing to the advantage that the inventive inorganic fiber exhibits remarkably smaller decrease in the fiber strength at high temperatures than the conventional silicon carbide fibers prepared from a polycarbosilane compound.

In addition to the above mentioned high-temperature performance, the inventive inorganic fiber has excellent mechanical strength, heat resistance and oxidation resistance as well as affinity or wettability with various metals and plastic resins and inertness to metals so that the inventive fiber product is very useful as a reinforcing material in FRPs, FRMs and FRCs.

In the following, the method of the present invention is described in more detail by way of examples, in which Me and Ph denote a methyl and a phenyl group, respectively.

EXAMPLE 1

Into a four-necked flask equipped with a thermometer, gas exit tube for discharging gases and vapors, stirrer and gas inlet tube for the introduction of an inert gas were introduced 200 g of a dimethylpolysilane of the formula $(Me_2Si)_n$ in a white powdery form obtained by the reaction of dimethyl dichlorosilane and metallic sodium and 20 g of B-trimethyl-N-triphenyl borazine of the formula $(-BMe-NPh-)_3$ and the mixture was heated gradually in an atmosphere of an inert gas. When the temperature of the reaction mixture had reached about 250° C., the start of the thermal decomposition was indicated by the formation of a volatile matter as a clear liquid distillate. The temperature of the mixture was further increased gradually up to 380° C. and the mixture was agitated for 2 hours at this temperature followed by cooling to give 143 g of a clear, yellowish green resinous material melting at 135° to 142° C. The yield was about 65% of the theoretical value. This resinous material was then subjected to stripping of volatile constituents of low molecular weight by melting at 250° C. under a reduced pressure of 5 mmHg. The resinous material thus freed from low-molecular constituents had a melting point of 172° to 184° C. and a number-average molecular weight of 2230 and the results of the elementary analysis for silicon and boron indicated that the molar ratio of silicon to boron was about 13:1.

The resinous material was then heated at 240° C. in an apparatus for melt spinning and spun into air through a spinnerette having a single hole at a velocity of 100 m/minute into a filament having a diameter of 15 μm. A half portion of the thus obtained green filament was infusibilized by heating in air in an oven by increasing the temperature from room temperature to 170° C. at a rate of 10° C./hour and keeping the filament at this temperature for 2 hours. The other half portion of the green filament was infusibilized by irradiating at room temperature with gamma-rays to give an irradiation dose of $1.0 \times 10^6$ rads.

Each portion of the thus infusibilized filament in two ways was calcined in a heating furnace in an atmosphere of nitrogen gas under a tension of 50 g/mm² by increasing the temperature up to 1200° C. taking 10 hours and keeping the filament at this temperature for 2 hours. The thus obtained inorganic fibers had a diameter of 11 μm and were lustrous in black. The tensile strength and elastic modulus of the inorganic fibers were 280 kg/mm² and 20.5 tons/mm² for the fibers infusibilized by the oxidation treatment and 320 kg/mm² and 19.5 tons/mm² for the fibers infusibilized by the gamma-ray irradiation.

EXAMPLE 2

A mixture composed of 200 g of the same dimethylpolysilane as used in Example 1 and 10 g of B-trimethyl-N-triphenyl borazine was heated at 380° C. under normal pressure for 3 hours to effect the reaction therebetween followed by cooling to give 131 g of a copolymeric resin melting at 147° to 159° C. of which the molar ratio of silicon to boron was 25.7:1. The yield was 62.4% of the theoretical value. This resinous material was subjected to stripping of the volatile constituents of low molecular weight by melting at 240° C. under a pressure of 5 mmHg. The thus obtained clear, yellowish green resinous material had a melting point of 181° to 189° C. and the number-average molecular weight thereof was 2360.

The resinous material was then heated at 250° C. in an apparatus for melt spinning and spun through a spinnerette having a single hole at a velocity of 100 m/minute to give a green filament having a diameter of 18 μm. A half portion of the thus obtained green filament was infusibilized by gradually increasing the temperature in air up to 170° C. and keeping the filament at this temperature for 2 hours. The other half portion of the green filament was infusibilized by irradiating with electron beams using a curtain-flow type electron beam accelerator to give an irradiation dose of $1.5 \times 10^6$ rads.

Figure 2:
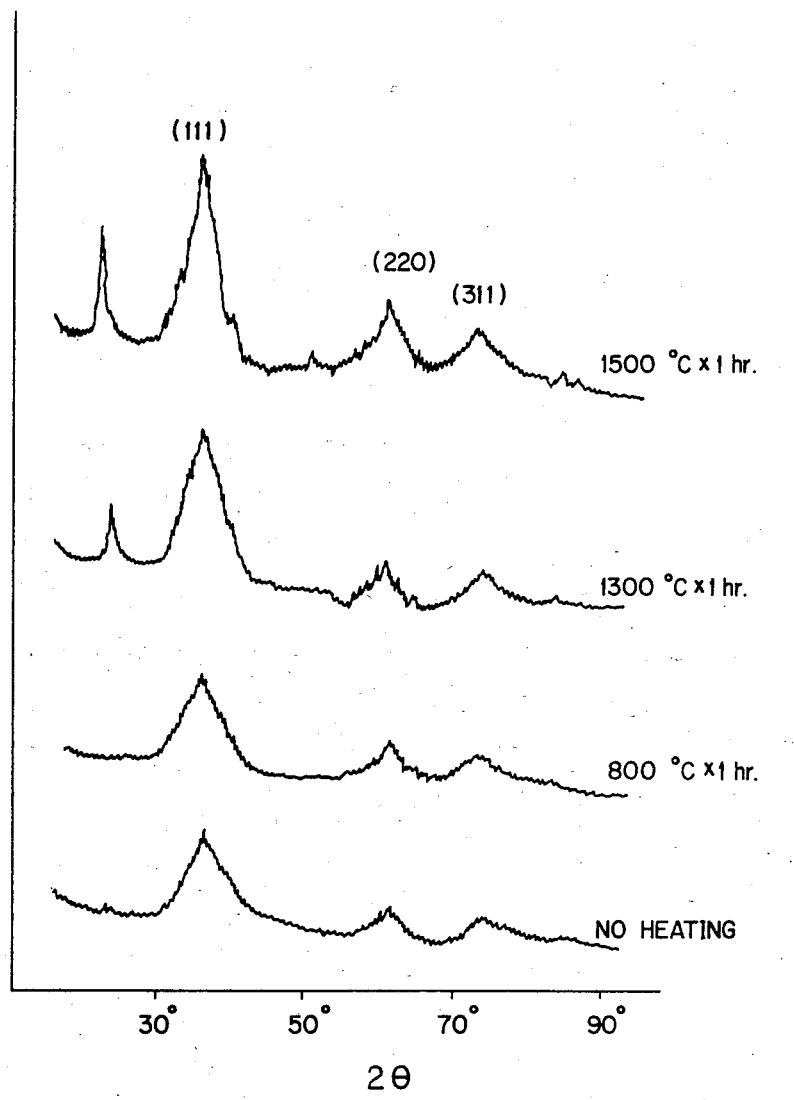
Figure 3:
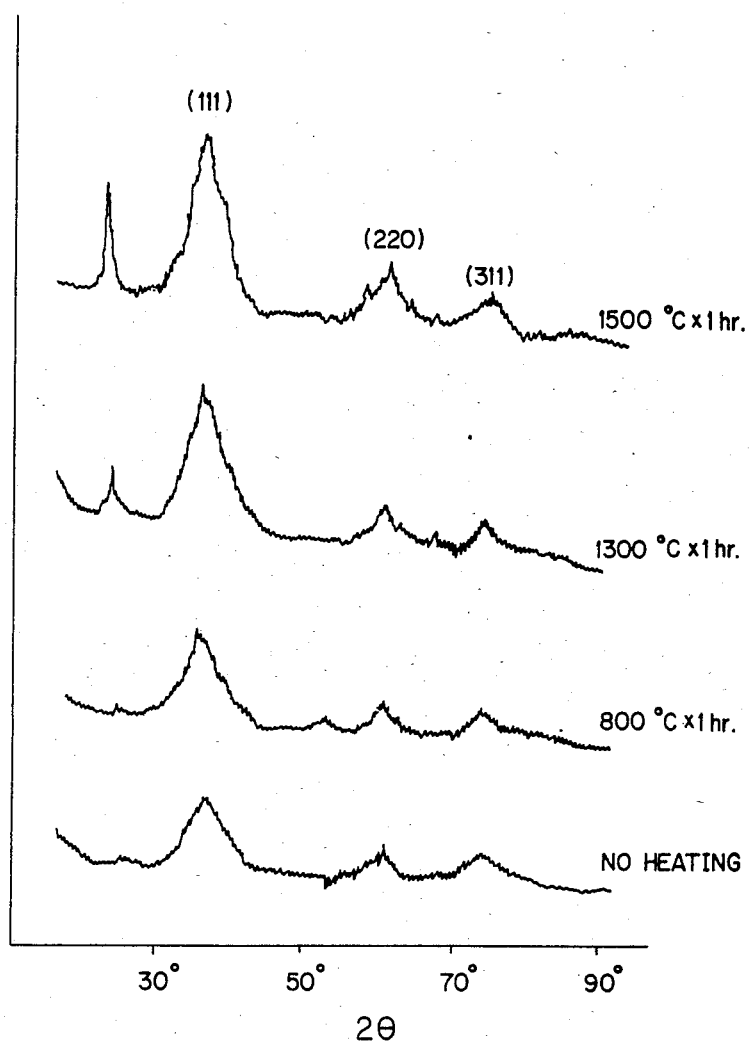

In the next place, the thus infusibilized filament was calcined under a tension of 50 g/mm² in an atmosphere of nitrogen gas by gradually increasing the temperature up to 1300° C. and keeping this temperature for 2 hours to give a black, lustrous filament of continuous length having a diameter of 12 μm. Each portion of the thus prepared inorganic fiber after the infusibilization by the oxidation treatment or the electron beam irradiation was subjected to the tensile test either as prepared or after heating for 1 hour at varied temperatures of 500° to 1500° C. to give the results of the tensile strength shown in Table 1 and FIG. 1 which also include the results obtained for a commercial product of silicon carbide fibers (Nicalon, a product by Nippon Carbon Co.). Table 1 also includes the results of the chemical analysis. FIGS. 2, 3 and 4 each illustrate the X-ray diffraction diagrams of the above prepared inventive inorganic fibers after the infusibilization by the oxidation treatment, the same after the infusibilization by the electron beam irradiation and the commercially available silicon carbide fibers, respectively, either as prepared or after the 1 hour heat treatment at varied temperatures as mentioned above using Cu Kα line as the X-ray source.

moved from the reaction mixture by distillation and the remaining liquid mixture was, after cooling, added to an ether solution containing 8 moles of methylmagnesium chloride dissolved therein so that the residual silicon-bonded chlorine atoms were methylated to give 229 g of a methylpolysilane mixture having a viscosity of 52.3 centistokes at 25° C.

Then, 200 g of the thus obtained methylpolysilane mixture were admixed with 10 g of B-trivinyl-N-triphenyl borazine and the mixture was heated at 370° C. for 3 hours in an atmosphere of nitrogen gas under normal pressure to give 136 g of an organoborosilicon polymer melting at 132° to 149° C., of which the molar ratio of silicon to boron was 24.3:1. The above mentioned yield was 64.8% of the theoretical value. This organoborosilicon polymer was freed from low molecular constituents by stripping at 230° C. under a reduced pressure of 3 mmHg to give a resinous product melting at 180° to 187° C. and having a number-average molecular weight of 1880.

The resinous material was then heated at 260° C. in an apparatus for melt spinning and spun through a spinnerette having a single hole at a velocity of 200 m/minute to give a green filament having a diameter of 15 μm.

TABLE 1

| | Results of chemical analysis, % by weight | | | | | Tensile strength, kg/mm², after heating for 1 hour at* | | | | | |
|---|---|---|---|---|---|---|---|---|---|---|---|
| | Si | C | B | N | O (balance) | Room temperature | 500° C. | 800° C. | 1100° C. | 1300° C. | 1500° C. |
| Inventive fibers, infusibilized by oxidation | 57.8 | 32.6 | 0.89 | 1.15 | 7.56 | 310 | 310 | 315 | 295 | 245 | 175 |
| Inventive fibers, infusibilized by electron beam irradiation | 60.5 | 34.7 | 0.91 | 1.18 | 2.71 | 320 | 315 | 320 | 310 | 280 | 220 |
| Commercial silicon carbide fibers | 56.7 | 33.0 | — | — | 10.3 | 280 | 285 | 270 | 230 | 175 | 95 |

*Measurement was performed at room temperature 1 hour after the end of heating for 1 hour.

As is shown in Table 1 and FIG. 1, the inventive inorganic fibers are composed of the elements of silicon, carbon, boron and nitrogen and have remarkably improved heat resistance in comparison with the commercially available silicon carbide fibers. Further, comparison of the X-ray diffraction diagrams in FIGS. 2 to 4 indicates that, while the sharpness of the diffraction peaks due to the β-SiC crystallites greatly increased in the X-ray diffraction diagrams of the commercially available silicon carbide fibers in FIG. 4 as the temperature of the heat treatment increased as a reflection of the growth of the crystallite size, such a change in the diffraction peaks due to the β-SiC crystallites is much less remarkable in FIGS. 2 and 3 for the inventive inorganic fibers indicating that the crystallite growth is strongly inhibited by the introduction of the boron/nitrogen moieties in the chemical structure.

EXAMPLE 3

A reaction mixture formed by adding 2.5 g of HMPA to 800 g of a high-boiling disilane mixture obtained as a byproduct in the direct synthesis of methyl chlorosilanes by the reaction of metallic silicon and methyl chloride and composed of 59.3% by weight of dimethyl tetrachlorodisilane and 40.7% by weight of trimethyl trichlorodisilane was heated and distilled off under agitation at 100° to 280° C. for 3 hours to effect the decomposition and condensation reaction of the disilanes. Thereafter, 380 g of methyl chlorosilanes were re- Infusibilization of this green filament was performed by heating the filament in air under a tension of 10 g/mm² at 150° C. for 2 hours after temperature elevation at a rate of 20° C./hour up to the temperature. This infusibilized filament was subsequently subjected to calcination by heating under a tension of 50 g/mm² in a stream of argon gas at 1300° C. for 1 hour after temperature elevation from room temperature to 1300° C. taking 10 hours to give a black, lustrous filament of continuous length having a diameter of 11 μm. The thus obtained inorganic fibers had a tensile strength of 320 kg/mm² at room temperature, which was decreased to 310 kg/mm² after heating for 1 hour at 1300° C., and an elastic modulus of 21 tons/mm².

EXAMPLE 4

A white powdery polysilane mixture was prepared by the reaction of a 9:1 by moles mixture of dimethyl dichlorosilane and diphenyl dichlorosilane and metallic sodium and 200 g of this polysilane mixture were admixed with 5 g of B-triamino-N-triphenyl borazine and heated at 350° C. for 4 hours to give 145 g of an organoborosilicon polymer melting at 150° to 156° C., of which the molar ratio of silicon to boron was 46.3:1. The above mentioned yield was 70.1% of the theoretical value. This organoborosilicon polymer was freed from low molecular constituents by stripping at 230° C. under a reduced pressure of 3 mmHg to give a resinous product melting at 186° to 195° C. and having a number-average molecular weight of 1820.

The resinous material was then heated at 250° C. in an apparatus for melt spinning and spun into a green filament having a diameter of 15 μm which was infusibilized by irradiating with electron beams to give an irradiation dose of $1.2 \times 10^6$ rads by use of the same electron beam accelerator as used in Example 2. The thus infusibilized filament was subsequently subjected to calcination without tension in an atmosphere of nitrogen gas by heating at 1200° C. for 30 minutes after temperature elevation from room temperature to 1200° C. taking 15 hours to give a black, lustrous filament of continuous length having a diameter of 12 μm. The thus obtained inorganic fibers had a tensile strength of 295 kg/mm$^2$ at room temperature which was decreased to 285 kg/mm$^2$ after heating at 1300° C. for 1 hour.

What is claimed is:

1. A method for the preparation of an inorganic fiber comprising the elements of silicon, carbon, boron and nitrogen which comprises the steps of:

(a) heating a reaction mixture composed of an organosilicon compound having, in a molecule, at least one silicon-to-silicon linkage and at least one group denoted by $R^1$, $R^1$ being a hydrogen atom or a monovalent hydrocarbon group selected from the class consisting of methyl, ethyl, vinyl and phenyl groups, bonded to the silicon atom and an organoboron compound represented by the unit formula —BR$^2$—NR$^3$—, in which $R^2$ is a monovalent group selected from the class consisting of monovalent hydrocarbon groups, trihydrocarbylsilyl-substituted alkyl groups of the formula —(CH$_2$)$_n$SiR$^4$$_3$, $R^4$ being a monovalent hydrocarbon group and n being a positive integer, and substituted or unsubstituted amino groups of the formula —NR$^5$$_2$, $R^5$ being a hydrogen atom or a monovalent hydrocarbon group, and $R^3$ is a monovalent hydrocarbon group, in the molar ratio of silicon to boron in the range from 2:1 to 200:1 at a temperature in the range from 250° to 500° C. in an inert atmosphere to effect the thermal decomposition and polycondensation reaction of the reactants forming an organoborosilicon polymer having a number-average molecular weight in the range from 1,000 to 50,000;

(b) spinning the organoborosilicon polymer into a fibrous form;

(c) infusibilizing the thus formed fiber of the organoborosilicon polymer; and (d) calcining the infusibilized fiber of the organoborosilicon polymer at a temperature in the range from 900° to 1800° C. in an atmosphere of vacuum or an inert gas.

2. The method as claimed in claim 1 wherein the organoboron compound is a borazine compound represented by the general formula (—BR$^2$—NR$^3$—)$_3$, in which $R^2$ and $R^3$ each have the meaning as defined above.

3. The method as claimed in claim 1 wherein the organosilicon compound is an organopolysilane compound.

4. The method as claimed in claim 1 wherein the spinning in the step (b) is performed by melt spinning of a melt of the organoborosilicon polymer.

5. The method as claimed in claim 1 wherein the spinning in the step (b) is performed by dry spinning of a dope of the organoborosilicon polymer in an organic solvent.

6. The method as claimed in claim 1 wherein the infusibilization of the fiber of the organoborosilicon polymer in the step (c) is performed by heating the fiber at a temperature in the range from 100° to 200° C. in an oxidizing atmosphere.

7. The method as claimed in claim 1 wherein the infusibilization of the fiber of the organoborosilicon polymer in the step (c) is performed by the irradiation thereof with actinic rays to give an irradiation dose in the range from $10^5$ to $10^{10}$ rads.

8. The method as claimed in claim 1 wherein the calcination of the infusibilized fiber of the organoborosilicon polymer in the step (d) is performed at a temperature in the range from 1000° to 1600° C.

* * * * *